US005180638A

United States Patent [19]

Teekman

[11] Patent Number: 5,180,638

[45] Date of Patent: Jan. 19, 1993

[54] METHOD FOR REDUCING THE LEACHABILITY OF GRANULAR MATERIAL AND GRANULAR MATERIAL OBTAINED USING THIS METHOD

[75] Inventor: Gertjan A. O. Teekman, Harderwijk, Netherlands

[73] Assignee: Aardelite Holding B.V., Nijkerk, Netherlands

[21] Appl. No.: 626,017

[22] Filed: Dec. 12, 1990

[30] Foreign Application Priority Data

Dec. 18, 1989 [NL] Netherlands ........................ 8903092

[51] Int. Cl.[5] ............................................ B32B 9/04

[52] U.S. Cl. ................................ 428/407; 427/221; 427/242; 428/403

[58] Field of Search ............... 427/220, 221, 138, 242, 427/212; 106/273.1; 428/403, 407

[56] References Cited

U.S. PATENT DOCUMENTS 3,010,840 11/1961 Goff et al. .......................... 427/220
3,481,768 12/1969 Gowdy .............................. 427/220
3,619,263 11/1971 Bremer .............................. 427/220
4,087,572 5/1978 Nimerick ............................ 427/214
4,280,921 7/1981 May .................................... 419/11
4,474,852 10/1984 Craig ................................ 427/205
4,741,782 5/1988 Styron ................................ 106/694

FOREIGN PATENT DOCUMENTS 24809 11/1936 Australia ............................ 427/220
621408 6/1961 Canada .............................. 427/221
1121532 1/1962 Fed. Rep. of Germany ...... 427/220
2914286 10/1980 Fed. Rep. of Germany ...... 427/220
2523473 9/1983 France .
53-1218 1/1978 Japan ............................... 52/169.14
1440309 6/1976 United Kingdom ................ 428/403
1589216 5/1981 United Kingdom ................ 427/220

OTHER PUBLICATIONS

Environmal Science & Technology, vol. 15 (Mar. 1981) pp. 239-240.

*Primary Examiner*—Shrive Beck
*Assistant Examiner*—Terry J. Owens
*Attorney, Agent, or Firm*—Edmund M. Jaskiewicz

[57] ABSTRACT

A method for reducing the leachability of granular material which consists essentially of an inorganic binder and a filler containing contaminants, in which individual particles of the granular material are coated with a closed coating of a water-insoluble and water-repellent polymer composition. The coating is preferably a bituminous material.

5 Claims, 1 Drawing Sheet

2
1
D
d

METHOD FOR REDUCING THE LEACHABILITY OF GRANULAR MATERIAL AND GRANULAR MATERIAL OBTAINED USING THIS METHOD

BACKGROUND OF THE INVENTION

The present invention relates to a method for reducing the leachability of granular material, which essentially consists of an inorganic binder and a filler, which contains contaminants.

A method of this type is known from EP-A-0,208,871. With this method, a hydraulic binder is digested in water until it essentially no longer settles out, after which the aqueous colloidal solution thus obtained is mixed with a fine-particled waste material. During this mixing the water content of the mixture is adjusted such that the mixture can agglomerate. The mixture is then agglomerated and hardened. According to this method, each particle of waste material is enclosed within a layer of binder, as a result of which the leachability of the waste particles is reduced.

However, a method of this type has the disadvantage that the granular material formed still shows some degree of leachability, for example by rainwater if the granular material is dumped or by the mixing water if said granular material is used as a filler in, for example, concrete or the like.

Damage to the skin of hardened hydraulic binder can also occur during subsequent storage or handling of such material, as a result of which the leachability of the granules is increased again.

SUMMARY OF THE INVENTION

The present invention has the aim of eliminating the abovementioned disadvantages and to this end is characterised in that the granular material prepared is coated with a closed coating of water-insoluble and water-repellent material.

The result achieved by this coating of the granular material is that the contaminants present in the granular material can no longer be reached by water (mixing water, rainwater, etc.) and thus can no longer be leached out. The filler which contains the contaminants is usually fly ash, ash from coal or waste incineration, dredger sludge, etc. These fillers contain, as the most important contaminants, heavy metals, which are extremely harmful to the environment. The method according to the present invention prevents these heavy metals and other contaminants being able to pass into the environment as a result of leaching. This means that the granular material which is coated using the method according to the present invention can be dumped or used as filler in, for example, concrete or other building materials without risk to the environment.

Advantageously, the coating is formed by a watertight and/or water-repellent polymer composition, the polymer composition preferably consisting of bituminous material. The use of a bituminous material such as tar, pitch or asphalt has the advantage that a coating is obtained with said material which is plastically deformable and in general has such good adhesion and toughness that damage virtually does not occur. Watertight and/or water-repellent polymer compositions and coating methods for coating granular material with these materials are generally known in the specialist field.

Preferably, the coating of the granular material is carried out in an asphalt mill.

Depending on the degree of watertightness and/or water repellency of the polymer composition used, the thickness of the coating layer on the granular material can be varied. Preferably, the coating is applied in a thickness such that the ratio of the thickness of the coating to the diameter of the coated granule is at least 0.05. Of course, the thickness of the coating will depend on the application of the coated granular material. If the granular material is to be dumped, a thicker coating will be more necessary than when the granular material is to be used as a filler in, for example, concrete, in order to guarantee the reduced leachability.

Since granular material is not always perfectly spherical, the diameter is here taken to mean the average transverse dimension. In general, the granular material to be coated can approximately be regarded as spherical.

The invention also relates to granular material which has been obtained with the aid of the method according to the invention.

The invention will be illustrated by way of example below with reference to the appended drawing.

DESCRIPTION OF THE PREFERRED EMBODIMENTS

Figure 1:
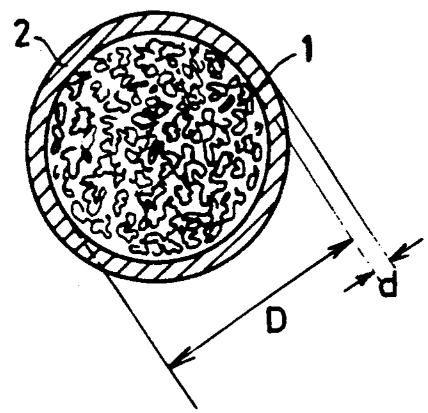
FIG. 1 shows a spherical granule which has been coated in accordance with the invention.

In FIG. 1 a granule 1 is shown which has been coated in accordance with the invention with a coating 2. The granule 1 in this case consists of ash from the incineration of coal, which ash has been bonded with calcium oxide, and the granule 1 having been coated with tar.

Figure 2:
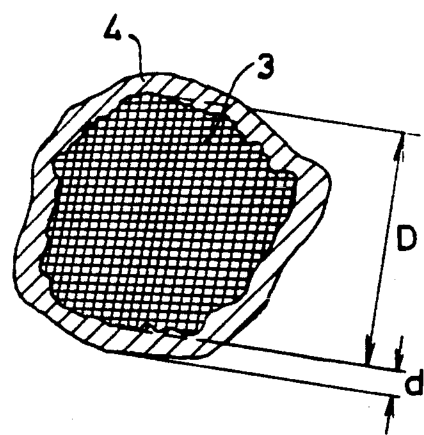
FIG. 2 shows a granule of irregular shape, which has likewise been coated in accordance with the invention.

In FIG. 2 a dried particle 3 of dredger sludge is shown which has been coated with a coating 4 consisting of a silicone polymer.

In both figures D is the diameter of the uncoated granule and d the thickness of the coating. In FIG. 2 D is, as described above, the average transverse dimension since the granules to be coated do not always have to be spherical, although they can generally be regarded as being approximately spherical. The ratio d/D is preferably greater than or equal to 0.05.

An illustrative embodiment of the method according to the invention now follows for illustration.

EXAMPLE 94 parts by weight of fly ash, originating from a power station, were mixed with 16 parts of calcium oxide and the whole was mixed with water to obtain a mass which was granulated in a granulating drum.

The granules obtained were hardened for 3 hours at a temperature of 95° C. in an atmosphere saturated with water vapour. The granules thus obtained were then coated in an asphalt mill with 10 parts by weight of tar per 100 parts by weight of the granules.

The coated granules produced were outstandingly suitable for use as filler in concrete or other building materials.

What is claimed is:

1. Method for reducing the leachability of particles of granular material consisting essentially of an inorganic binder and a filler containing contaminants, comprising coating the individual particles of the granular material with a closed coating of a water-insoluble and water-repellent polymer composition such that the contaminants in the filler cannot be reached by water.

2. Method according to claim 1, wherein the coating is a layer of bituminous material.

3. Method according to claim 2, wherein the coating of the granular material with bituminous material is carried out in an asphalt mill.

4. Method according to claim 1 wherein the closed coating is applied in a thickness such that the ratio of the thickness of the coating is at least 0.05.

5. A coated granular material having reduced leachability, comprising granular material consisting essentially of an inorganic binder and a filler containing contaminants, individual particles of the granular material having thereon a closed coating of a water-insoluble and water-repellent polymer composition such that the contaminants in the filler cannot be reached by water.

* * * * *